Oct. 23, 1951     E. L. RITTER     2,572,759
SCREW-CUTTING LATHE
Filed Sept. 3, 1948     4 Sheets—Sheet 1

INVENTOR.
EUGENE L. RITTER
BY
H. K. Parsons & C. W. Wright
ATTORNEYS

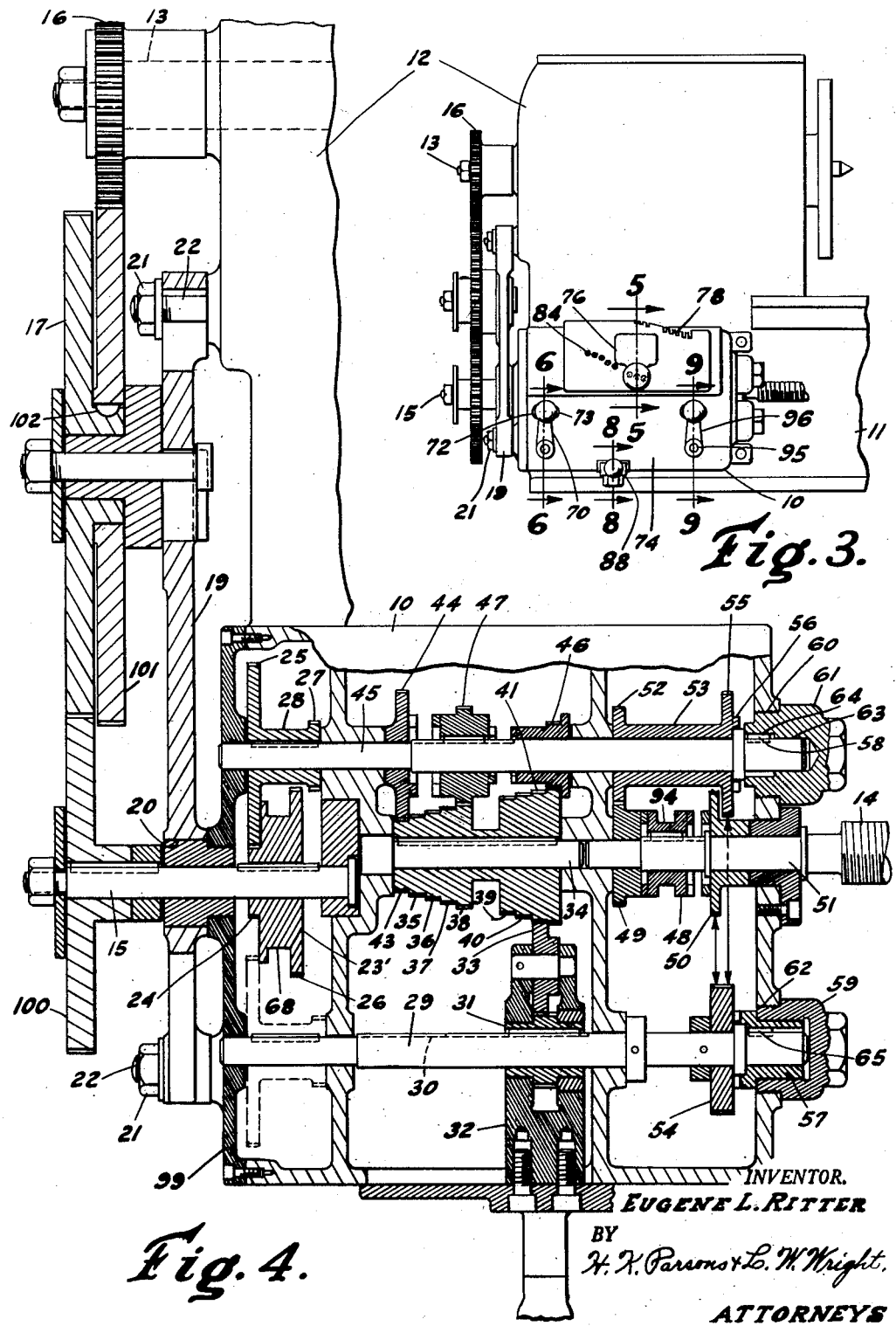

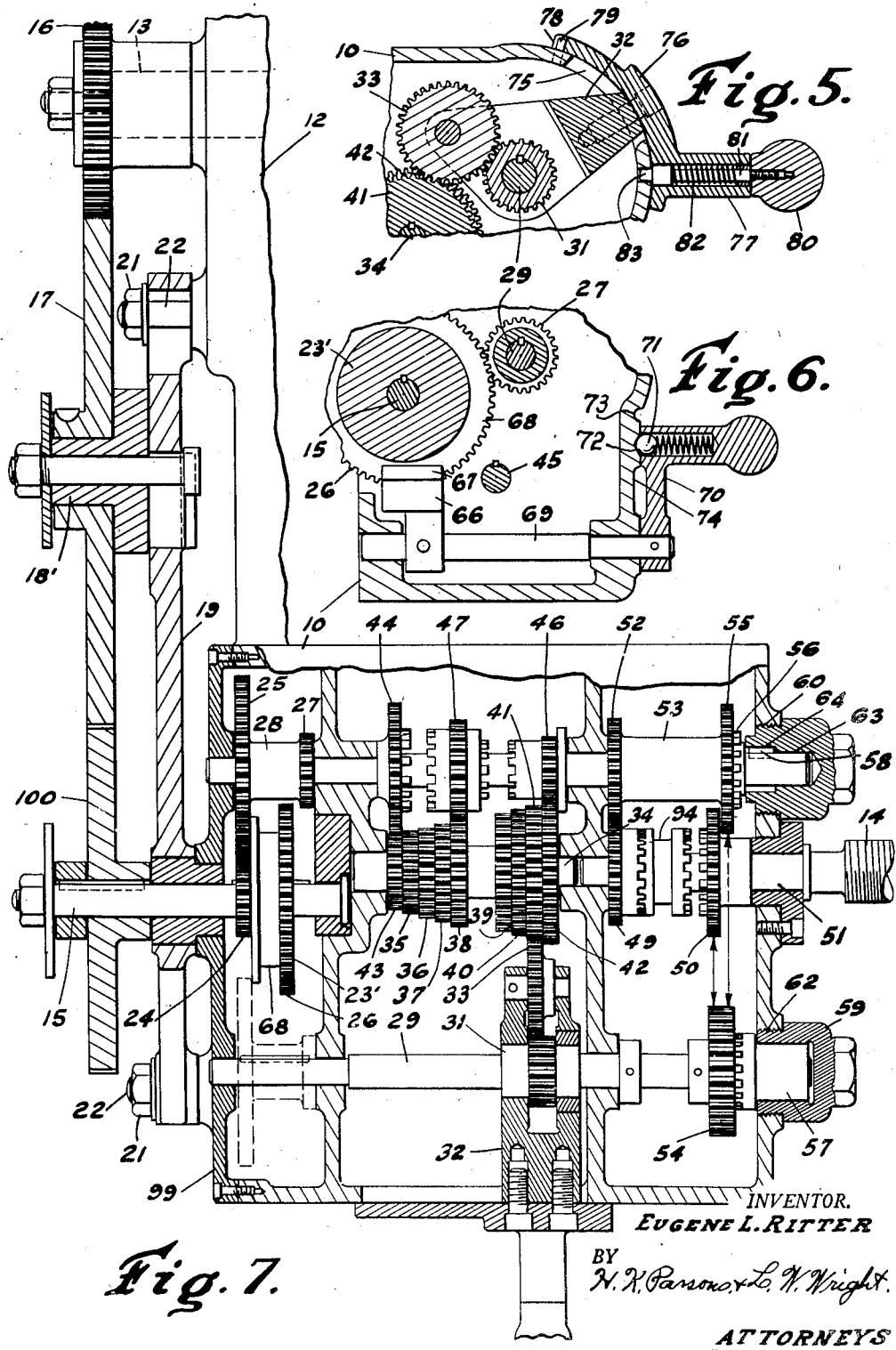

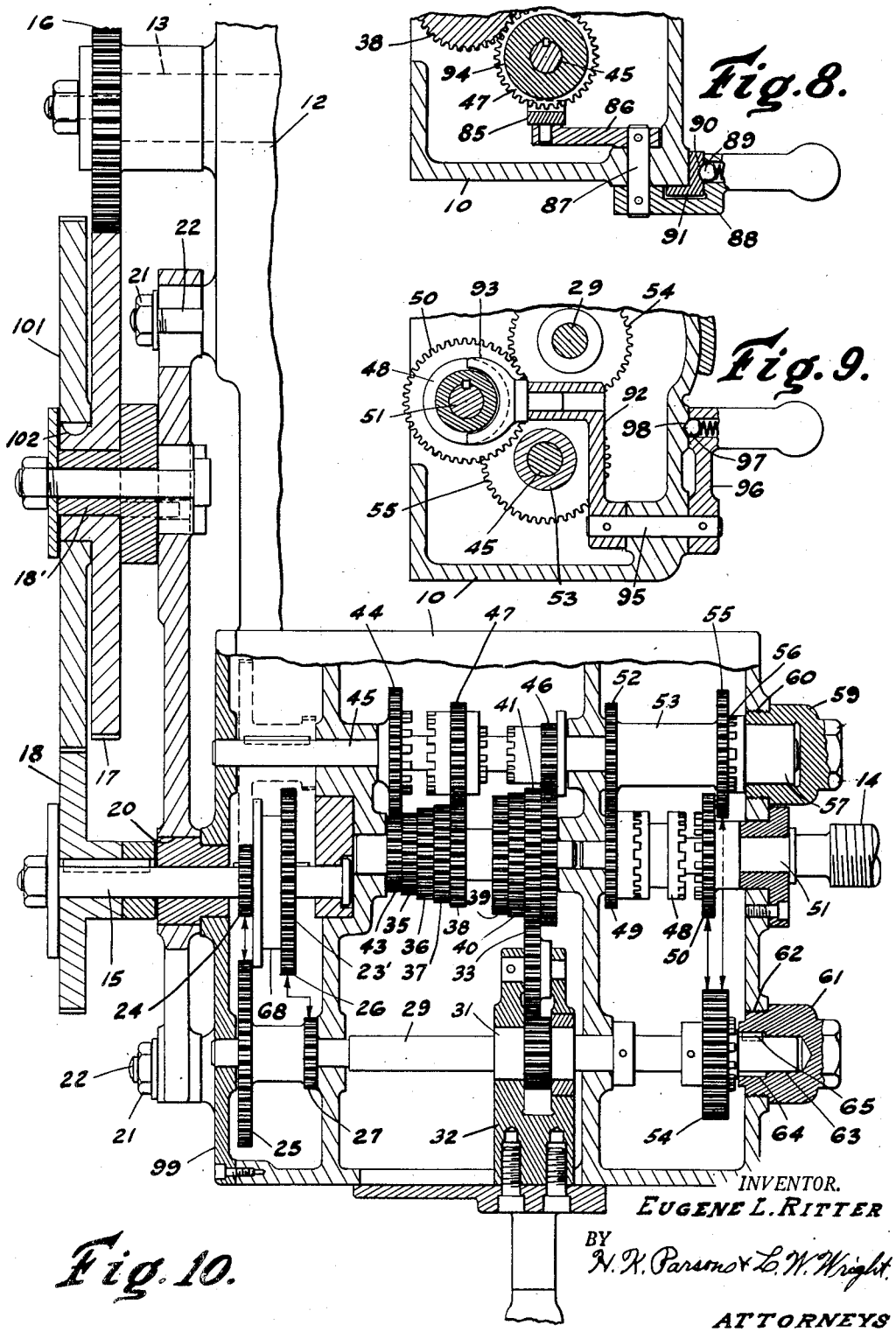

Patented Oct. 23, 1951

2,572,759

UNITED STATES PATENT OFFICE 2,572,759

SCREW-CUTTING LATHE

Eugene L. Ritter, Cincinnati, Ohio, assignor to The Cincinnati Lathe & Tool Co., Cincinnati, Ohio, a corporation of Ohio Application September 3, 1948, Serial No. 47,667

6 Claims. (Cl. 74—325)

This invention relates to machine tools and more particularly to improvements in screw cutting lathes.

One of the objects of this invention is to provide an improved screw cutting lathe which may be readily utilized for cutting American standard threads or millimeter pitch threads.

Another object of this invention is to provide a gear box mechanism for a screw cutting lathe which may be assembled or utilized with either an American standard lead screw or with a millimeter pitch lead screw for cutting either type of thread.

A further object of this invention is to provide an improved gear box mechanism which, when utilized with an American standard lead screw, may be readily adjusted for selective cutting of either American standard screw threads or millimeter pitch screw threads.

Another object of this invention is to provide an improved gear box mechanism which when utilized with a millimeter pitch lead screw may be readily arranged for cutting either millimeter pitch threads or American standard threads.

Still another object of this invention is to provide a gear box which may be adjusted to yield four different series of ratios or speeds between a work spindle and lead screw of a screw cutting lathe so that either an American standard thread or a millimeter pitch thread may be cut regardless of whether the lead screw has an American standard thread or a millimeter pitch thread.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

Referring to the drawings in which like reference numerals indicate like or similar parts:

Figure 3 is a front elevation of the headstock end of a lathe showing the mechanism of this invention applied thereto.

Figure 4 is a view similar to Figure 2 with the parts arranged for cutting metric screws with an American standard lead screw.

Figure 5 is a detail section on the line 5—5 of Figure 3.

Figure 6 is a detail section on the line 6—6 of Figure 3.

Figure 7 is a view similar to Figure 2 with the parts arranged for cutting metric screws with a metric lead screw.

Figure 8 is a detail section on the line 8—8 of Figure 3.

Figure 9 is a detail section on the line 9—9 of Figure 3.

Figure 10 is a section similar to Figure 2 with the parts arranged for cutting American standard screws with a metric lead screw.

Figures 1, 2:
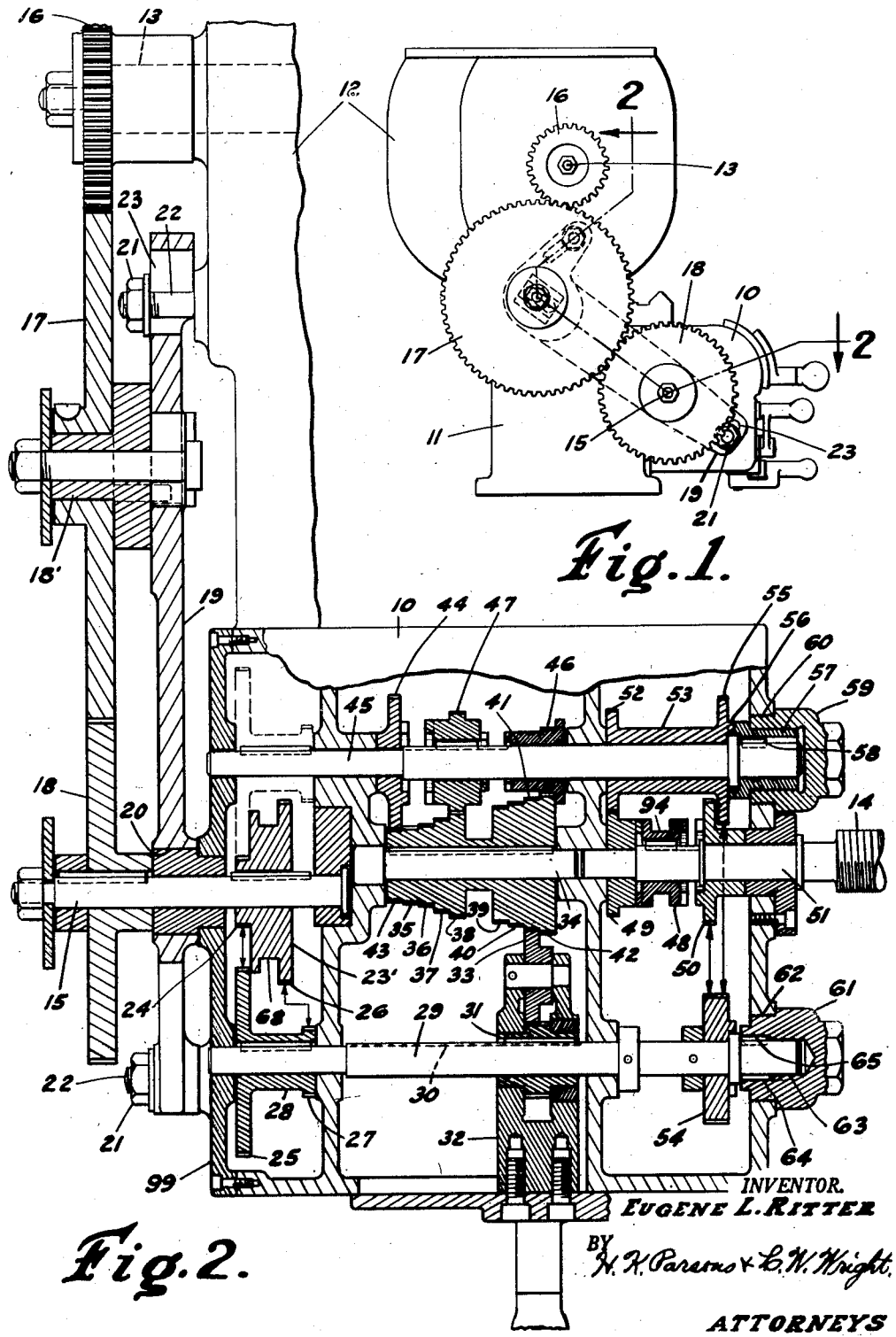
Figure 1 is an end elevation of the headstock of a screw-cutting lathe showing the change gear drive from the spindle.
Figure 2 is a section on the line 2—2 of Figure 1.

This invention relates to screw cutting lathes and more particularly to improving the construction of such machines for the purpose of making it possible to cut either American standard or millimeter pitch threads with the same machine. It is obvious that a basic machine could be provided for one of these purposes having a suitable gear box and a lead screw with an American standard thread for cutting American standard threads; and for the other purpose, a different gear box with a lead screw having a millimeter pitch thread for cutting metric threads. In screw cutting machines the lead screw is driven from the work spindle through a transmission which may be adjusted to cause rotation of the lead screw in some predetermined ratio to one rotation of the spindle in accordance with the pitch of the thread desired to be cut. In accordance with this invention, a common transmission is provided, comprising a change gear mechanism and a gear box of such a nature that a single machine may be built which is so adjustable that the spindle may be connected in proper driving ratios with either an American standard lead screw or a millimeter pitch lead screw for cutting either type of thread with either type of lead screw. Thus, by the use of a single transmission mechanism such as disclosed by this invention, a basic machine having an American standard lead screw or a basic machine having a metric standard lead screw may be provided, but each basic machine has the capacity for being readjusted for cutting the other type of thread.

Referring now to the drawings, and more particularly to Figures 1 and 2, there is shown in Figure 1 one arrangement of a change gear mechanism; and contained in the gear box 10, shown in Figure 2, is a variable speed transmission which connects the change gear mechanism to the lead screw, said transmission being shown in the proper adjusted relation for cutting American standard threads with a lead screw having an American standard thread.

In Figure 1, the reference numeral 11 indicates the bed of a screw cutting lathe having the gear box 10 attached to the front side, and upon the top of the bed is a spindle housing 12 having a work spindle 13 suitably journaled therein. This spindle is driven from any suitable source of power not shown and is utilized herein as the driver for the transmission mechanism which couples the spindle 13 to an American standard lead screw indicated by the reference numeral 14 in Figure 2. The gear box has a drive shaft 15 which serves as a power input shaft, and this shaft is connected to the spindle 13 by a change gear mechanism which in this embodiment comprises the gears 16, 17, and 18.

The gear 16 is secured to the end of the spindle 13 while intermediate gear 17 is journaled for free rotation on a stud 18' which is carried by an adjustable arm 19 that is pivotally mounted on the fixed sleeve 20 which is concentric to the axis of the shaft 15. The gear 18 is keyed to the shaft 15, and the arm 19 is angularly adjusted to place the idler gear 17 into mesh with the gears 16 and 18 and is then clamped in position by the clamping nuts 21 which are threaded on the ends of stud screws 22 which pass through elongated slots 23 formed in the arm 19.

In the gear box 10, there is a shiftable gear couplet 23' which is splined on the shaft 15 for selective engagement of gear 24 with gear 25, or alternatively gear 26 with gear 27. The gears 25 and 27 are integral, thus forming a couplet 28 which is keyed to the shaft 29. Thus, the shaft 29 may be driven at two different rates from the shaft 15 in accordance with the positioning of the couplet 23'. The shaft 29 is provided with a long spline 30 to which is keyed a gear 31 which is mounted in an oscillatably and axially shiftable shifter 32. The shifter 32 is adapted to oscillate about the axis of the shaft 29 for the purpose of engaging a tumbler gear 33 journaled therein with any one of a set of stepped cone gears carried by an intermediate shaft 34. There are eight gears shown in the set indicated by the reference numerals 43, 35, 36, 37, 38, 39, 40, and 41, although this number may be varied. These cone gears are keyed to the shaft 34 so that rotation of any one of these gears by the shaft 29 through the gears 31 and 33 will cause rotation of all of these gears.

The shaft 34 carries an additional gear 42 which is constantly in mesh with a gear 46 which is supported for free rotation on a back gear shaft 45 journaled at opposite ends in the gear box 10. The gear 43 is in constant mesh with gear 44 which is also supported for free rotation on the shaft 45. A third gear 47, slidably splined on the shaft 45 intermediate the gears 44 and 46, is provided with clutch teeth on opposite faces for engagement with clutch teeth on the adjacent faces of gears 44 and 46. When the gear 47 is in the position shown in Figure 2 it is in mesh with the gear 38, but when it is shifted to the left, as viewed in this figure, it becomes disengaged from the gear 38 but clutched to the gear 44 and thus serves to connect the gear 44 for rotation with the shaft 45. When the gear 47 is shifted to the right, it clutches gear 46 in driving relation to the shaft 45. Thus, the gear 47 is capable of connecting the shaft 34 in three different driving ratios to the shaft 45 and regardless of which one of the cone gears is being driven. It will thus be seen that by means of the two selections that may be made by the shiftable couplet 23', and the eight different connections that can be made between the shaft 29 and 34 and the three different connections that can be made between the shaft 34 and the shaft 45 that a total of 48 different speeds can be obtained for the rotation of shaft 45, and this means 48 different ratios between the rate of rotation of the work and the rate of travel of the threading tool.

The shaft 45 is adapted to be reversibly connected to the lead screw 14 in a one to one ratio by means of a shiftable reversing clutch 48 which has clutch teeth on opposite faces for engaging similarly formed clutch teeth on the adjacent faces of gears 49 and 50 which are supported for free rotation on the shaft 51 which forms an extension of the lead screw 14. The gear 49 is intermeshed with the gear 52 of the couplet 53 which is supported directly on the shaft 45, while the gear 50 is connected by an intermediate idler 54 to the gear 55 of the couplet 53 whereby the gears 49 and 50 will be driven in opposite directions. Attention is invited to the fact that the gear couplet 53 has clutch teeth 56 on the end face thereof for engagement with a removable sleeve 57, which sleeve is keyed at 58 to the shaft 45 and thus serves as a driving connection between the shaft 45 and the couplet 53. This sleeve is journaled in a thimble 59 which is threaded at 60 into the end wall of the gear box. This thimble is interchangeable with a second thimble 61 located in the lower part of the box for supporting the end of the shaft 29.

The thimble 61 is threaded at 62 in the end wall of the gear box, and the thread is the same size and the number of threads as on the end of thimble 59 whereby the thimble may be interchanged as explained hereafter.

It will be noted that the thimble 61 has a smaller bore 63 in which the end of the shaft 29 is journaled, and a larger bore 64 which forms a clearance for the key 65 permanently fixed in the shaft 29 whereby the shaft is free to rotate independent of the thimble 61.

The purpose of the interchangeable thimbles is that in some cases, as in that shown in Figure 2, it is desirable that the gear 53 be connected to the shaft 45, while in other cases it is desirable that the gear 53 be supported for free rotation on the shaft 45 and that the gear 54 be connected in driving relation to the shaft 29. By simply interchanging the thimbles 59 and 61 it is possible to make these changes in driving relationship of the gears with respect to their supporting shafts.

In the form of the invention shown in Figure 2, the lead screw 14 is assumed to have an American standard thread cut thereon and the gearing of the transmission mechanism is arranged so that shifting of the various gear elements of the gear box makes possible a selective range of threads which will be in accordance with the American standard system. For example, by making the change gear mechanism between the shaft 13 and the shaft 15 in the ratio of three to four; the shiftable gear couplet 23' in the ratio of one to three between gear 24 and gear 25; and eight to three between the gear 26 and 27; the cone gears in eight ratios with respect to the tumbler gear ranging from one to one when intermeshed with gear 43, to twelve to twenty-three when intermeshed with gear 42; and the back gears in the ratio of two to one between gears 42 and 46, one to one between gears 38 and 47, and one to two between gears 43 and 44, a range of 48 different feeds and threads may be cut. One limit of this range or the greatest number of threads per inch would be computed by taking the lowest ratio of each shiftable unit and therefore would be equal to $3/4 \times 1/3 \times 12/23 \times 1/2$ equal to $3/46$. It will now be obvious that with a 6 pitch lead screw that this would yield 92 threads per inch. It is obvious that this limit could be changed by using a different pitched lead screw.

Taking the highest ratios it would give 3/4 × 8/3 × 1 × 2 equal 4, and this with a 6 pitch lead screw would give 1½ threads per inch.

Referring now to Figure 6, there is shown the mechanism for shifting the gear couplet 23 comprising a shifter member 66 having a portion 67 which interfits the shifter groove 68 formed in the member 23', the member 66 being keyed to a rotatable shaft 69. This shaft is supported at opposite ends for rotation in the walls of the gear box 10 and is provided with an operating handle 70 which carries a spring pressed detent ball 71 which is adapted to alternatively engage detent 72 or 73 formed in the front wall 74 of the gear box 10 as shown in Figure 3. Thus, the shaft 29 may be driven in two different ratios by the shaft 15.

In Figure 5 is shown the mechanism for shifting the tumbler gear 33 comprising the shifter member 32 which is oscillatably supported on the shaft 29 as previously described, and this shifter member passes through a slot 75 formed in the wall of the gear box 10 and has attached to its end on the outside of the box a plate 76 which has an integrally formed handle 77. The plate is of sufficient size to close the opening 75 and on its upper surface is provided with a series of notches 78 corresponding in number to the number of cone gears. These notches are adapted to embrace a locating pin 79 secured in the wall 10 of the gear box.

A knob 80 is secured to the end of a retractable pin 81 which is slidably mounted in the handle 77 and normally urged by a spring 82 to hold the end of the pin 83 in engagement with one of a series of holes 84 drilled in the wall of the gear box. Thus by retracting the pin 81 the shifter 32 may be rotated about the shaft 29 to lift the gear 33 out of engagement with one cone gear, then shifted axially with respect to the shaft 29 to position the gear 33 in alignment with another cone gear for intermeshing therewith upon subsequent rotation of the shifter 32 in the opposite direction. Thus, by means of this mechanism the gear 33 may be selectively intermeshed and locked in driving relation with any one of the various cone gears.

In Figure 8 is shown the mechanism for shifting the back gear 47 with respect to its shaft 45 comprising a shifter fork 85 which is pivotally connected to the shifter arm 86 secured to one end of a shaft 87 which extends through the wall of the gear box 10 for attachment of an operating handle 88 thereto. The operating handle 88 has a spring pressed detent ball 89 mounted therein for selective engagement with one of three detents 90 formed in an angle plate 91 secured to the end of the gear box. The mechanism for shifting the reversing clutch 48 is shown in Figure 9 and comprises a shifter arm 92 which has a shifter fork 93 supported in the end thereof and in engagement with the shifter groove 94 formed in th clutch 48. The arm 92 is secured to the end of a shaft 95 which passes through the wall of the gear box 10 and has an operating lever 96 secured to the outer end thereof for effecting rotation of the arm 92. The lever 96 has a spring pressed detent ball 97 mounted therein for selective engagement with any one of three detents 98 formed in the wall of the gear box 10.

When it is desired to cut metric threads with an American standard pitch lead screw such as that described in connection with Figure 2, the end wall 99 of the gear box 10, as shown in Figure 4, is removed and the transposable gear couplet 28 is removed from its dotted line position on shaft 29 and mounted on the keyed end of shaft 45, whereby the shaft 15 will now drive the shaft 45 rather than the shaft 29. In addition, the thimbles 61 and 59 are interchanged whereby the drive now passes from the shaft 45 through the back gears to the cone gears, from the cone gears through the tumbler gear to the shaft 29 and sleeve 57 keyed to the end thereof to the gear 54 clutched with the sleeve 57. The gear 54 drives gear 49 through the gear couplet 53 which will rotate independently of the shaft 45, and also drives gear 50 but in the opposite direction.

In addition, the change gear 18 is removed from the shaft 15 and a substitute gear 100 is mounted in its stead. The idler gear 17 shown in Figure 2 is reversed in position and a metric conversion gear 101 is compounded with the gear 17 by being mounted on the keyed hub 102 of the gear 17 and in position to mesh with the gear 16 and thus be driven thereby while the gear 17 is in position to mesh with the gear 100.

The conversion gear is preferably provided with 127 teeth which is a multiple of 25.4, there being 25.4 millimeters in an inch. Thus, the overall ratio of the change gears becomes 135/254. Although the gear couplet 28 has been shifted to the shaft 45, the high and low ratios between shaft 15 and shaft 45 still remains 8 to 3, and one to three. Since the direction of drive through the cone gears is now in an opposite direction, the range of ratios through these gears is now from one to one, to two to one, while the back gear ratios remain the same.

Thus, one limit of the range through the transmission now becomes 135/254×1/3×1×1/2 equals 2.25/25.4. Since the lead screw remains the same and has 6 threads per inch, the pitch of one thread in millimeters would be equal to 25.4/6 and therefore if the final ratio is multiplied by this figure we would have 2.25/25.4×25.4/6 equal .375 mm. The other limit would be equal to 135/254×8/3×2/1×23/12 equals 45×16/127. Multiplying this by the pitch of the six threads per inch lead screw in millimeter we would have 45×16/127×25.4/6 equal to 23 mm. Thus, by simply shifting the gear couplet 28 and reversing the thimbles 59 and 61 and adding the metric conversion gear in the change gear mechanism, metric threads may be cut with an American lead screw having a millimeter pitch ranging from .375 to 23.

In the arrangement shown in Figure 7 it is assumed that the lead screw 14 has a metric thread of 4 mm. pitch and the transmission arrangement is such that metric pitch screws may be cut in a work piece. It will be noticed that the transmission in the gear box remains the same as that shown in Figure 4, while the change gear mechanism has only been changed by removing the metric conversion gear 101 and directly coupling the idler gear 17 between the gears 16 and 100 whereby the gear 17 becomes simply an idler gear. By making the change gear ratio 9/16 and with the ratios in the gear box remaining the same, one limit of the range of threads that can be cut would be 9/16×1/3×1×1/2 equals 3/32, and this multiplied by the pitch of the lead screw, which is 4 mm., would give 3/8 or .375 mm. pitch of thread. The other limit would be found as follows: 9/16×8/3×2×23/12 equals 69/12 times the pitch of the lead screw in millimeters would equal 23 mm. Thus, a range of threads from .375 mm. to 23 mm. could be cut with the arrangement shown in Figure 7.

In Figure 10 the transmission is shown rearranged for cutting American standard threads for the 4 mm. pitch lead screw shown in Figure 7. In this figure the gear box is rearranged the same as that shown in Figure 2 and the change gear transmission has the conversion gear 101 reinstated or compounded with gear 17, but this time in mesh with a gear 18 and thus transmit power to the gear 18 which is mounted on the shaft 15 while the gear 17, on which the gear 101 is keyed is in mesh with the gear 16. The gear 18 is so chosen that the overall ratio between the shaft 13 and 15 is equal to 127/160. Since the ratios in the gear box are the same as in Figure 2, one limit would be $127/160 \times 1/3 \times 12/23 \times 1/2$ equals $127/160 \times 2/23$, and this multiplied by the pitch of the lead screw in inches, which would be 4/25.4, would equal 1/92 or 92 threads per inch. The other limit would be $127/160 \times 8/3 \times 1 \times 2$ equals $127/30 \times 4/25.4$ equals 2/3 or 1½ threads per inch for the other limit.

There has thus been provided an improved transmission mechanism for a screw cutting lathe which may be utilized with a lead screw having a thread of either pitch, that is, American standard or millimeter, and which is capable of cutting either type of thread with either pitch of lead screw.

What is claimed is:

1. In a screw cutting lathe having a spindle, a variable speed mechanism including first and second shafts, and means for interconnecting said shafts in a plurality of different ratios, the combination of means for selectively connecting the spindle to either of said shafts whereby one of said shafts becomes the driving shaft and the other the driven shaft including a power input shaft having a permanent gear couple thereon, a transposable gear couple connectible to either the first or the second shaft, means to shift said first-named gear couple alternately into engagement with either gear of said transposable gear couple, change gears including an idler gear coupling the spindle to said power shaft in a prescribed ratio for each position of said transposable gear, and a translating gear compoundable with the idler gear in a position to be driven therefrom when the transposable gear is mounted on the first shaft, and in a second position for transmitting power to the idler gear when the transposable gear is mounted on the back gear shaft.

2. In a screw cutting lathe having a spindle, a variable speed mechanism including first and second shafts, and means for interconnecting said shafts in a plurality of different ratios, the combination of means for selectively connecting the spindle to either of said shafts whereby one of said shafts becomes the driving shaft and the other the driven shaft including a power input shaft having a permanent gear couple thereon, a transposable gear couple connectible to either the first or the second shaft, means to shift said first-named gear couple alternately into engagement with either gear of said transposable gear couple, change gears including an idler gear coupling the spindle to said power shaft in a prescribed ratio for each position of said transposable gear, a translating gear compoundable with the idler gear in a position to be driven therefrom when the transposable gear is mounted on the first shaft, and in a second position for transmitting power to the idler gear when the transposable gear is mounted on the back gear shaft, a feed screw journaled in the lathe having a pair of reverse gears loosely mounted thereon and an interposed reversing clutch, idler gears mounted on said first and second shafts respectively and operatively connected to said reverse gears, and means to connect the first shaft or the second shaft whichever is being driven by the other to its respective idler gears selectively to effect actuation of the reversing mechanism.

3. In a screw cutting lathe having a spindle, a variable speed transmission mechanism including a first shaft, a back gear shaft, an intermediate shaft having a set of cone gears thereon, and means for connecting said gears to said first and back gear shafts respectively in a plurality of different ratios, the combination therewith of means for selectively connecting the spindle to the first shaft or back gear shaft whereby one of said shafts becomes the driving shaft and the other the driven shaft, including a power input shaft having a permanent gear thereon, a transposable gear meshing therewith for connecting either the first shaft or the back gear shaft to the input shaft, change gears on the spindle and input shaft for coupling the spindle to said input shaft in two prescribed ratios, one for each position of the transposable gear, a pair of compound gears including a translating gear, and supporting means for reversibly positioning said compound gears between said change gears to effect alternative meshing of the translating gear with the change gear on the spindle when the transposable gear is mounted on said back gear shaft, or with the change gear on the input shaft when the transposable gear is mounted on said first shaft.

4. In a screw cutting lathe having a spindle, a variable speed transmission mechanism including a first shaft, a back gear shaft, an intermediate shaft having a set of cone gears thereon, and means for connecting said gears to said first and back gear shafts respectively in a plurality of different ratios, the combination therewith of means for selectively connecting the spindle to the first shaft or back gear shaft whereby one of said shafts becomes the driving shaft and the other the driven shaft, including a power input shaft having a permanent gear thereon, a transposable gear meshing therewith for connecting either the first shaft or the back gear shaft to the input shaft, change gears on the spindle and input shaft for coupling the spindle to said input shaft in two prescribed ratios, one for each position of the transposable gear, a pair of compound gears including a translating gear, supporting means for reversibly positioning said compound gears between said change gears to effect alternative meshing of the translating gear with the change gear on the spindle when the transposable gear is mounted on said back gear shaft, or with the change gear on the input shaft when the transposable gear is mounted on said first shaft, and a reversing mechanism for actuation by said transmission including means for selectively connecting said mechanism for actuation selectively by the first shaft or back gear shaft whichever is being driven by the other in accordance with the position of the transposable gear.

5. In a screw cutting lathe having a spindle, a variable speed transmission mechanism including a first shaft, a back gear shaft, an intermediate shaft having a set of cone gears thereon, and means for connecting said gears to said first and back gear shafts respectively in a plurality of different ratios, the combination therewith of means for selectively connecting the spindle to the first shaft or back gear shaft whereby one of said shafts becomes the driving shaft and the other the driven shaft, including a power input shaft having a sliding gear couple splined thereon, a transposable gear couple selectively meshing therewith for connecting the input shaft to either the first shaft or the back gear shaft, change gearing coupling the spindle to said input shaft in two different ratios, one for each position of the transposable gear, including a change gear on the spindle and a change gear on said input shaft, a pair of compound gears including a translating gear, and supporting means for reversibly positioning said compound gears between said change gears to effect alternative meshing of the translating gear with the change gear on the spindle when the transposable gear is mounted on said back gear shaft, or with the change gear on the input shaft when the transposable gear is mounted on said first shaft.

6. In a screw cutting lathe having a spindle, a variable speed transmission mechanism including a first shaft, a back gear shaft, an intermediate shaft having a set of cone gears thereon, and means for connecting said gears to said first and back gear shafts respectively in a plurality of different ratios, the combination therewith of means for selectively connecting the spindle to the first shaft or back gear shaft whereby one of said shafts becomes the driving shaft and the other the driven shaft, including a power input shaft having a sliding gear couple splined thereon, a transposable gear couple selectively meshing therewith for connecting the input shaft to either the first shaft or the back gear shaft, change gearing coupling the spindle to said input shaft in two different ratios, one for each position of the transposable gear, including a change gear on the spindle and a change gear on said input shaft, a pair of compound gears including a translating gear, supporting means for reversibly positioning said compound gears between said change gears to effect alternative meshing of the translating gear with the change gear on the spindle when the transposable gear is mounted on said back gear shaft, or with the change gear on the input shaft when the transposable gear is mounted on said first shaft, and a reversing mechanism for actuation by said transmission including means for connecting said mechanism for actuation selectively by the first shaft or back gear shaft whichever is being driven by the other in accordance with the position of the transposable gear.

EUGENE L. RITTER.

REFERENCES CITED

The following references are of record in the file of this patent:

UNITED STATES PATENTS

| Number | Name | Date |
|---|---|---|
| 918,773 | Schotz | Apr. 20, 1909 |
| 1,074,819 | Schellenbach | Oct. 7, 1913 |
| 1,545,052 | Ingham | July 7, 1925 |
| 1,628,598 | Bird | May 10, 1927 |
| 1,982,612 | Hoelscher | Nov. 27, 1934 |